United States Patent
Satgurunathan et al.

(10) Patent No.: US 10,167,408 B2
(45) Date of Patent: Jan. 1, 2019

(54) AQUEOUS COMPOSITION WITH IMPROVED ELONGATION AT BREAK

(71) Applicant: DSM IP ASSETS B.V., Heerlen (NL)

(72) Inventors: Rajasingham Satgurunathan, Echt (NL); Jurgen Scheerder, Echt (NL); Gerardus Cornelis Overbeek, Echt (NL); Roel Johannes Marinus Swaans, Echt (NL); Ronald Tennebroek, Echt (NL); Tijs Nabuurs, Echt (NL); Maud Kastelijn, Echt (NL); Hinrike Malda, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 245 days.

(21) Appl. No.: 15/306,279

(22) PCT Filed: Apr. 23, 2015

(86) PCT No.: PCT/EP2015/058838
§ 371 (c)(1),
(2) Date: Oct. 24, 2016

(87) PCT Pub. No.: WO2015/162220
PCT Pub. Date: Oct. 29, 2015

(65) Prior Publication Data
US 2017/0044391 A1 Feb. 16, 2017

(30) Foreign Application Priority Data

Apr. 25, 2014 (EP) .................................... 14166013

(51) Int. Cl.
*C09D 133/12* (2006.01)
*C09D 133/10* (2006.01)
*C08L 25/14* (2006.01)
*C08L 33/08* (2006.01)
*C08L 33/12* (2006.01)
*C09D 125/14* (2006.01)
*C09D 133/08* (2006.01)

(52) U.S. Cl.
CPC ............ *C09D 133/12* (2013.01); *C08L 25/14* (2013.01); *C08L 33/08* (2013.01); *C08L 33/12* (2013.01); *C09D 125/14* (2013.01); *C09D 133/08* (2013.01); *C09D 133/10* (2013.01); *C08L 2205/03* (2013.01)

(58) Field of Classification Search
CPC ...... C08L 75/04; C08L 75/06; C08L 2201/50; C08L 2201/52; C09D 175/04; C09D 175/06; C09D 133/08; C09D 133/12; C09D 133/02
See application file for complete search history.

(56) References Cited

U.S. PATENT DOCUMENTS

| | | | | |
|---|---|---|---|---|
| 5,571,857 | A * | 11/1996 | Gruber | B32B 7/12 524/457 |
| 6,362,273 | B1 * | 3/2002 | Martin | C08F 283/006 524/457 |
| 7,049,352 | B2 * | 5/2006 | Gould | C08F 285/00 523/201 |
| 7,217,758 | B2 * | 5/2007 | Buckmann | C09D 5/02 524/501 |
| 7,358,294 | B2 * | 4/2008 | Buckmann | C08F 283/006 524/507 |
| 8,765,852 | B1 * | 7/2014 | Swei | C09D 4/06 524/277 |
| 9,074,038 | B2 * | 7/2015 | Satgurunathan | C08G 18/12 |
| 2006/0258801 | A1 * | 11/2006 | Martin | C08G 18/12 524/591 |
| 2013/0281593 | A1 * | 10/2013 | Yamazaki | C09D 7/41 524/377 |

FOREIGN PATENT DOCUMENTS

| | | |
|---|---|---|
| GB | 2 362 387 | 11/2001 |
| WO | WO 99/16805 | 4/1999 |
| WO | WO 2005/023947 | 3/2005 |
| WO | WO 2012/084668 | 6/2012 |

OTHER PUBLICATIONS

International Search Report and Written Opinion of the ISA for PCT/EP2015/058838, dated Jul. 13, 2015, 11 pages.

* cited by examiner

*Primary Examiner* — Michael M Dollinger
(74) *Attorney, Agent, or Firm* — Nixon & Vanderhye P.C.

(57) ABSTRACT

An aqueous polymer composition which when in the form of a film shows excellent elongation at break comprising (i) 5 to 30 wt. % of polyurethane where the acid value of the polyurethane is between 3 to 40 mg KOH/g; (ii) 70 to 95 wt. % of vinyl polymer comprising 20 to 90 wt. % of vinyl polymer with Tg<20° C.; 10 to 80 wt. % of vinyl polymer with Tg≥20° C.; where at least one of the vinyl polymers contains acid functional groups with acid value in the range of from 15 and 240 mg KOH/g.

17 Claims, No Drawings

AQUEOUS COMPOSITION WITH IMPROVED ELONGATION AT BREAK

This application is the U.S. national phase of International Application No. PCT/EP2015/058838 filed 23 Apr. 2014, which designated the U.S. and claims priority to EP Patent Application No. 14166013.4 filed 25 Apr. 2014, the entire contents of each of which are hereby incorporated by reference.

The present invention relates to aqueous polymer compositions comprising 5 to 30 wt. % of a polyurethane and 70 to 95 wt. % of at least two vinyl polymers with certain Tg characteristics and the use of such aqueous compositions in coatings, in particular coatings for wooden substrates.

It is known in the art to employ aqueous polymer compositions for the production of coatings, where the polymers provide the binder material for such coatings. It is further known that combinations of polymers can be used to further improve the properties of the resulting coatings when compared to using such a polymer on its own. It is also known that wooden substrates are not dimensionally stable and may expand under warm and humid conditions.

GB 2362387 discloses a solvent-free aqueous multipolymer composition comprising a soft vinyl polymer having a Tg of less than 20° C., a hard vinyl polymer having a Tg of at least 20° C., and a chain-extended polyurethane to provide an improved combination of low MFFT and high hardness and good block resistance and early blocking properties. GB 2362387 teaches a preference for more than 50% of the polyurethane and a greater than 1.1:1 ratio of isocyanate groups to isocyanate-reactive groups.

EP 0666275 discloses a method for making a polyurethane-vinyl polymer hybrid composition useful as a film for film laminate adhesive. The Tg of the polyacrylate is below −20° C. and is used in amounts from 25 to 75 wt. %.

WO 99/16805 discloses an aqueous polymer composition containing a polyurethane polymer and a vinyl polymer in a ratio of from 30/70 to 5/95 with a NCO/OH ratio from 1.4 to 2.9 and a Tg of the vinyl polymer in the range from −50 to 120° C. WO 99/16805 teaches a preference for more than 50% of iscocyanate in the polyurethane.

WO 2003/031526 discloses a pigmented aqueous coating composition providing good blocking and elasticity properties which comprises a blend of a seeded multistage polymer latexes having at least one soft and at least one hard polymer phases and a non-film-forming polymer latexes, the seed polymers having a Tg≥10° C. lower than that of the hard polymer phases and preferably having a Tg≥10° C. higher than that of the soft polymer phases, and the multistage polymers preferably having amino functionality incorporated by an imination reaction.

WO 2005/23947 discloses an aqueous coating composition comprising a polyurethane with an MFFT below ambient temperature and a polymer dispersion B with an MFFT above ambient temperature. Furthermore WO 2005/23947 teaches the use of more 40% of polyurethane and a preference for aromatic polyisocyanates.

WO2012/84668 discloses a process for making polyurethane polyacrylate hybrid dispersions where the polyurethane contains a high level of polyisocyanate and the acid value of the acrylic phase is less than 5 mgKOH/g.

We have now discovered that a combination of a low level of a specific polyurethane with low levels of polyisocyanate, with a high level of a combination of vinyl polymers with different glass transition values (Tg) and acid functional groups results in exceptionally good properties for many applications and in particular for outdoor applications where a high level of elongation at break and good blocking at low VOC (volatile organic solvents) are beneficial.

Furthermore a high level of toughness may contribute to a good impact and hail resistance which is an important requirement for most binder systems, especially outdoor applications.

To achieve a high level of elongation at break it is known to use a polymer with a low Tg, but this results amongst others in the formation of tacky films that for example have poor blocking resistance and high dirt pick-up. The block resistance and dirt pick-up can be improved by increasing the Tg, but this will reduce the toughness and elongation. In pure vinyl systems this can be overcome to some extent by, for instance, making sequential polymers that combine high Tg and low Tg phases that give non-tacky films with moderate levels of elongation. Typically, the toughness and elongation of such systems for clear film application is sufficient but upon pigmentation, they are rather low and improvements are needed. Such a rapid drop in elongation at break upon pigmentation means that only a limited amount of hard pigments can be added or that the system cannot be used for pigmented applications and/or outdoor applications. Furthermore, the impact resistance of such vinyl systems is rather poor.

Polyurethanes tend to have very good mechanical properties such as toughness and elongation and have a good impact resistance and a low dirt pick-up. This is due to the hydrogen bonding between the urethane groups and the soft-hard segmentation in urethanes. However, for certain application areas urethanes are too expensive.

One way to reduce the cost is to make urethane-vinyls. These combine the typical properties of vinyls like fast drying, good anti-blocking properties, with the very good mechanical properties of urethanes, like high toughness, high elongation at break and impact resistance and low dirt pick-up. However, often upon pigmentation the elongation at break is rapidly lost and as a result these urethane-vinyls cannot be used for outdoor application or can only be used in clear film applications.

We have found that having a combination of low amounts of a polyurethane with high levels of vinyl polymer that consists of a hard phase and a soft phase, a substantial increase in elongation at break is found, without losing blocking properties. The vinyl polymer can be a blend of a soft and hard vinyl polymer, a sequential polymer composition or an oligomer-polymer (where the soft vinyl polymer is polymerized in presence of the hard vinyl oligomer) composition.

With this invention binders can be made that have a high level of elongation at break as well as good blocking and toughness and that can be used for pigmented and outdoor applications.

According to the present invention there is provided an aqueous polymer composition comprising:
(i) 5 to 30 wt. % of polyurethane obtained by the reaction of:
  (a)
    (1) 9 to 31 wt. % of at least one polyisocyanate;
    (2) 0 to 8 wt. % of at least one isocyanate-reactive compound with a weight average molecular weight in the range of from 50 to 500 g/mol, containing ionic or potentially ionic water-dispersing groups;
    (3) 0 to 91 wt. % of at least one isocyanate-reactive compound with a weight average molecular weight in the range of from 501 to 5000 g/mol containing ionic or potentially ionic water-dispersing groups;

(4) 0 to 91 wt. % of at least one isocyanate-reactive compound with a weight average molecular weight in the range of from 501 to 5000 g/mol not comprised by (3);

where (3) and (4) add up to 57 to 91 wt. %;

(5) 0 to 10 wt. % of at least one isocyanate-reactive compound with a weight average molecular weight in the range of from 50 to 500 g/mol not comprised by (2);

where (1), (2), (3), (4) and (5) add up to 100%; and (b) at least one chain-extending compound;

where the acid value of the resulting polyurethane (i) is between 3 to 40 mg KOH/g;

(ii) 70 to 95 wt. % of vinyl polymer comprising (c) 20 to 90 wt. % of vinyl polymer with Tg<20° C.;

(d) 10 to 80 wt. % of vinyl polymer with Tg≥20° C.;

wherein (c) and (d) add up to 100%;

where at least one of (c) and (d) contains acid functional groups with acid value in the range of from 15 and 100 mg KOH/g; and wherein (i) and (ii) add up to 100%.

Preferably the aqueous polymer composition comprises 5 to 25 wt. % and more preferably 8 to 20 wt. % of the polyurethane (i) relative to (i) and (ii).

Preferably the aqueous polymer composition comprises 75 to 95 wt. % and more preferably 80 to 92 wt. % of the vinyl polymer (ii) relative to (i) and (ii).

The composition of the invention may comprise other polymers however the weight percentage of (i) and (ii) together is preferably more than 60 wt. %, more preferably more than 70 wt. %, especially more than 80 wt. % and most especially more than 90 wt. % of the total composition.

There is further provided according to the invention a method of coating a substrate using an aqueous polymer composition as defined above.

There is further provided according to the invention a coating obtainable or derived from an aqueous polymer composition as defined above.

There is further provided according to the invention a substrate having a coating obtainable or derived from an aqueous polymer composition as defined above.

Accordingly, for the purposes of the invention an "aqueous polymer composition" means a composition of the polymer in a liquid carrier medium of which water is the principle or only component. The invention composition will typically comprise colloidal dispersed particles of vinyl and polyurethane particles, i.e. will typically be in the form of an aqueous polymer latex.

Preferably the aqueous composition comprises less than 10 wt. % of organic solvent (by weight of total composition). More preferably it comprises less than 5 wt. % and most preferably it is a substantially solvent-free aqueous composition. By a substantially solvent-free aqueous composition is meant that the composition must contain less than 2.0 wt. % of organic solvent based on total composition, more preferably less than 0.5 wt. % and most preferably no solvent at all.

To maintain flexibility and to reduce yellowing during service life, the polyurethane polymer of the invention composition preferably has less than 2.5, more preferably less than 1.5, most preferably less than 0.5, especially less than 0.1 and most especially 0 mmoles per g of olefinically unsaturated bonds (i.e. no olefinically unsaturated bonds at all).

The polyurethane used in the invention composition is typically obtained as described below by the reaction of components (1) to (5) to form an isocyanate terminated prepolymer which is subsequently reacted with a chain-extending compound.

Preferably 10 to 28 wt. %, most preferably 15 to 24 wt. % of polyisocyanate (1) is used to make the polyurethane.

The organic polyisocyanate (1) used for making the prepolymer of the polyurethane is preferably an organic diisocyanate. Such organic diisocyanate may be an aliphatic (which term includes cycloaliphatic), araliphatic or aromatic polyisocyanate. Preferably, however, the polyisocyanate (1) is aliphatic. Preferably at least 50 wt. %, more preferably at least 60 wt. % and most preferably at least 75 wt. % of the total amount of polyisocyanate (1) used comprises aliphatic polyisocyanate.

Preferably at least 70 wt. %, more preferably at least 85 wt. % and most preferably at least 95.wt % of the polyisocyanates have two isocyanate groups.

Examples of suitable aliphatic polyisocyanates include ethylene diisocyanate, 1,6-hexamethylene diisocyanate (HDI), isophorone diisocyanate, cyclohexane-1,4-diisocyanate, 4,4'-dicyclohexyl methane diisocyanate, cyclopentylene diisoyanate, p-tetra-methylxylene diisocyanate (p-TMXDI) and its meta isomer (m-TMXDI), hydrogenated 2,4-toluene diisocyanate, hydrogenated 2,6-toluene diisocyanate, 1-isocyanato-1-methyl-3(4)-isocyanatomethyl-cyclohexane (IMCI), pentamethylene diisocyanate and mixtures thereof.

Suitable non-aliphatic polyisocyanates include p-xylylene diisocyanate, 1-4-phenylene diisocyanate, 2,4-toluene diisocyanate, 2,6-toluene diisocyanate, 4,4'-diphenylmethane diisocyanate, 2,4-diphenyl methane diisocyanate, 1,5-naththylene diisocyanate and mixtures thereof.

Mixtures of aliphatic and aromatic polyisocyanates can be used and also polyisocyanates which have been modified by the introduction of urethane, allophanate, urea, biuret, carbodiimide, uretonimide or isocyanurate residues.

Preferred polyisocyanates are 1,6-hexamethylene diisocyanate (HDI), pentamethylene diisocyanate, 4,4'-dicyclohexylmethane diisocyanate, isophorone diisocyanate and TMXDI (p or m).

Preferably at least 30 wt. %, more preferably at least 60 wt. % and most preferably at least 75 wt. % of the total amount of polyisocyanate (1) used is selected from HDI, pentamethylene diisocyanate and or mixtures thereof.

The polyurethane preferably has internal water-dispersing groups built into its structure whereby such groups preferably render the polyurethane self-water-dispersible. Such internal dispersing groups are more usually chain pendant groups and may be of the ionic type.

Ionic dispersing groups are more preferably anionic, for example $-SO_3^-$, $-OSO_3^-$, $-PO_3^-$, and in particular a carboxylate salt group $-CO_2^-$.

Potentially ionic water-dispersing groups include groups which are subsequently converted to water-dispersing groups. For example free (unionised) carboxylic acid groups can be neutralised to carboxylate anionic water-dispersing groups.

It is most preferred that ionic groups are incorporated into the prepolymer via carboxylic acid groups which are subsequently neutralised to carboxylate anionic groups using agents such as a tertiary amine (examples of which include triethylamine, triethanolamine, dimethylethanolamine, N-methyl or N-ethyl morpholine), or an alkaline hydroxide (examples of which include K, Na or Li hydroxide or a quaternary ammonium hydroxide). Ammonia itself may also be used. Preferably alkaline hydroxides are used. In view of sustainability the composition may also be volatile tertiary amine free.

The conversion of any acid groups present in the prepolymer to anionic salt groups may be effected by neutralising the acid groups before, after or simultaneously with the formation of an aqueous composition of the prepolymer.

Preferably 0 to 8 wt. % and more preferably 2 to 7 wt. % of at least one isocyanate-reactive compound (2) with a weight average molecular weight in the range of from 50 to 500 g/mol, containing ionic or potentially ionic water-dispersing groups is used.

Examples of isocyanate-reactive compounds (2) with a weight average molecular weight in the range of from 50 to 500 g/mol include carboxyl group-containing diols and triols, and in particular dihydroxy alkanoic acids of the formula: $(HOCH_2)_2CR^1COOH$ wherein $R^1$ is hydrogen or alkyl (usually 1-5C). The most preferred carboxyl-bearing polyol is 2,2-dimethylol propionic acid (DMPA). Another preferred one is 2,2-dimethylol-n butyric acid (DMBA).

Preferably 0 to 86 wt. % and more preferably 0 to 50 wt. %, most preferred 0 wt. % wt. % of at least one isocyanate-reactive compound (3) with a weight average molecular weight in the range of from 501 to 5000 g/mol containing ionic or potentially ionic water-dispersing groups is used.

Examples of isocyanate-reactive compounds (3) with a weight average molecular weight in the range of from 501 to 5000 g/mol containing ionic or potentially ionic water-dispersing groups include DMPA initiated caprolactone materials available from Solvay SBU Caprolactones, for example CAPA® HC 1060, CAPA® HC 1100 and CAPA® HC 1200 for 600 Mw, 1000 Mw and 2000 Mw respectively.

Preferably 0 to 86 wt. % and preferably 0 to 81 wt. % of at least one isocyanate-reactive compound (4) with a weight average molecular weight in the range of from 501 to 5000 g/mol not comprised by (3) is used.

Preferably compounds (3) and (4) add up to 64 to 86 wt. % and more preferably 69 to 81 wt. % relative to the amount of (1) to (5) together.

Preferably 0 to 6 wt. % and more preferably 0 to 3.5 wt. % of at least one isocyanate-reactive compound (5) with a weight average molecular weight in the range of from 50 to 500 g/mol not comprised by (2) is used. Most preferably 0 wt. % is used.

Isocyanate-reactive compounds include polymeric diol and polymeric polyols of functionality more than 2.

Such polyols may preferably be essentially linear. Such polyol in principle may be selected from any of the chemical classes of polymeric polyols used or proposed to be used in polyurethane synthesis. In particular the polymeric polyol may be a polyester polyol, a polyesteramide polyol, a polyether polyol, a polythioether polyol, a polycarbonate polyol, a polyacetal polyol, a polyolefine polyol or a polysiloxane polyol. More preferably the polymeric polyol is selected from a polyester polyol, a polyether polyol, a polysiloxane polyol, and particularly preferably a polyether polyol and a polyester polyol.

Polyester polyols which may be used include hydroxyl-terminated reaction products of polyhydric alcohols such as ethylene glycol, propylene glycol, diethylene glycol, neopentyl glycol, 1,4-butanediol, 1,6-hexanediol, furan dimethanol, cyclohexane dimethanol, glycerol, trimethylol propane or pentaerythritoll or mixtures thereof, with polycarboxylic acids, especially dicarboxylic acids or their ester-forming derivatives, for example succinic, glutaric and adipic acids or their methyl esters, phthalic anhydrides or dimethyl terephthalate. Polyesters obtained by the polymerisation of lactones, for example caprolactone, in conjunction with a polyol may also be used. Polyesteramides may be obtained by the inclusion of amino-alcohols such as ethanolamine in polyesterification mixtures.

Polyether polyols which may be used include products obtained by the polymerisation of a cyclic oxide, for example ethylene oxide, propylene oxide or tetrahydrofuran or by the addition of one or more such oxides to polyfunctional initiators, for example water, methylene glycol, ethylene glycol, propylene glycol, diethylene glycol, cyclohexane dimethanol, glycerol, trimethylopropane, pentaerythritol or Bisphenol A. Especially useful polyether polyols include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran.

Polyols having number average molecular weight Mn below 500 (which may be polymeric, or rather oligomeric, or monomeric) may be used as compound (5) in the preparation of the isocyanate-terminated prepolymer. Examples particularly include diols and (less preferably) triols or tetrols and mixtures thereof. Examples of such lower molecular weight polyols include ethylene glycol, diethylene glycol, tetraethylene glycol, bis(hydroxyethyl) terephthalate, 1,4-cyclohexane dimethanol, furan dimethanol, glycerol and the reaction products, up to Mn 499, of such polyols with propylene and/or ethylene oxide.

The isocyanate-reactive component may also include an organic mono-ol.

It will be appreciated that the isocyanate-reactive component may optionally include an isocyanate-reactive compound which is other than a polyol (e.g. a diamine or an aminoalcohol); however the isocyanate-reactive polyol component will normally be entirely of substantially comprised of polyol reactant.

Polyols may also include non-ionic water dispersing groups. Non-ionic dispersing groups are typically pendant polyoxyalkylene groups, particularly polyethylene oxide (PEO) groups. Such groups may, for example be provided by employing as a reactant in the prepolymer formation (and/or less preferably by being part of the chain-extender component) diols having pendant PEO chains such as those described in the prior art, for example U.S. Pat. No. 3,905, 929. Chain-pendant PEO groups may also be introduced by employing certain amine and hydroxyl functional compounds, or diols, as disclosed in EP 0317258. If desired, the PEO chains may contain units of other alkylene oxides in addition to the ethylene oxide units. Thus, PEO chains in which up to 60% of the alkylene oxide units are propylene oxide units, the remainder being ethylene oxide units, may be used.

The isocyanate-terminated polyurethane prepolymer may be prepared in conventional manner by reacting a stoichiometric excess of the organic polyisocyanate (NCO) with the isocyanate-reactive component (OH) under substantially anhydrous conditions at a temperature between about 30° and about 130° until reaction between the isocyanate groups and the isocyanate-reactive (usually all hydroxyl) groups is substantially complete.

Preferably the prepolymer is prepared with an NCO/OH ratio in the range of from 1.75 to 1.05, more preferably 1.6 to 1.2.

If desired, catalysts such as dibutyltin dilaurate or stannous octoate may be used to assist prepolymer formation.

Preferably though no tin based materials are used in the preparation of the prepolymer.

An organic solvent may optionally be added before, during or after prepolymer formation to control the viscosity provided it does not impact the possibility of obtaining of a solvent-free final composition, so any such solvent may need to be removed as far as is possible. Suitable solvents which may be used include propanone (acetone), methylethyl ketone, dimethylformamide, diglyme, N-methylpyrrolidone, ethyl acetate, ethylene and propylene glycol diacetates, alkyl ethers of ethylene and propylene glycol diacetates, alkyl ethers of ethylene and propylene glycol monoacetates, toluene, xylene and sterically hindered alcohols such as t-butanol and diacetone alcohol and mixtures thereof. If acetone is used it is usually known as the acetone process. The preferred solvents are water-miscible solvents such acetone and dialkyl ethers of glycol acetates. In cases where a vinyl polymer formed in-situ with the polyurethane polymer, the solvent for use in the prepolymer preparation may comprise a monomer which is subsequently polymerised to form part or all of the vinyl polymer.

Preferably no solvents are used which have a boiling point greater than that of acetone. Preferably no N-methyl pyrrolidone is used as a solvent. In an embodiment of the invention acetone is used as solvent. Preferably the aqueous composition of the invention comprises no added solvent except for what may remain after use of the acetone and removal of the acetone.

The prepolymer may be dispersed in water using techniques well known in the art.

For example the aqueous polyurethane composition is prepared by forming an aqueous composition of the isocyanate-terminated polyurethane prepolymer and dispersing it (optionally carried in an organic solvent medium which may comprise a monomer for making vinyl polymer) in an aqueous medium, preferably utilising self-dispersibility properties of the prepolymer arising from internal dispersing groups in the isocyanate-terminated prepolymer, although free surfactant may additionally be employed if desired, and chain-extending the prepolymer with an active hydrogen compound in the aqueous phase, the chain-extender being present in the aqueous phase during composition or added subsequently (i.e. chain-extension can take place during and/or after the composition into water in this embodiment).

Preferably, the prepolymer is added to the water with agitation or, alternatively, water may be stirred into the prepolymer component.

The chain-extender compound which may be reacted with the prepolymer component is suitably a primary or secondary aliphatic, alicyclic, aromatic, araliphatic or heterocyclic diamine or polyamine (i. e. having 3 or more amine groups), or hydrazine or a substituted hydrazine, or a polyhydrazide (preferably a dihydrazide).

Examples of such added chain-extenders useful herein include ethylene diamine, diethylene triamine, triethylene tetramine, propylene diamine, butylene diamine, hexamethylene diamine, cyclohexylene diamine, piperazine, 2-methyl piperazine, phenylene diamine, toluyiene diamine, xylylene diamine, tri (2-aminoethyl) amine, 3,3-dinitrobenzidine, 4,4'-diaminodiphenyl methane, m-xylene diamine, isophorone diamine, and adducts of diethylene triamine with acrylate or its hydrolysed products. Also materials such as hydrazine (e.g. in the form of its mono hydrate), azines such as acetone azine, substituted hydrazines such as, for example, dimethyl hydrazine, 1,6-hexamethylene-bis-hydrazine, carbodihydrazine, dihydrazides of dicarboxylic acids and sulphonic acids such as adipic acid dihydrazide, oxalic acid dihydrazide, isophthalic acid dihydrazide, hydrazides made by reacting lactones with hydrazine such as gamma hydroxylbutyric hydrazide, bis-semi-carbazide, and bis-hydrazide carbonic esters of glycols. Another suitable class of chain-extenders is the so-called "Jeffamine" compounds with a functionality of 2 or 3 (available from Huntsman). These are PPO or PEO-based di or triamines, e.g. "Jeffamine" T403 and "Jeffamine" D-400. Amino functional sulfonates (Vestamine A-95) and amino carboxylates can also be used.

Preferably the chain-extender component is or includes hydrazine (usually in the form of its monohydrate), or a di or triamine (usually a diamine) of Mn below 300. Water-soluble chain-extenders are preferred. More preferably the chain-extender is ethylene diamine, hydrazine, and/or water. Most preferably the chain-extender is water.

The chain-extension ran be conducted at elevated, reduced or ambient temperatures. Convenient temperatures are from about 5° C. to 90° C.

The total amount of chain-extender material employed (other than water) is preferably such that the ratio of active hydrogens in the chain-extender to NCO groups in the prepolymer component is preferably within the range of from 0.7/1 to 2.0/1 more preferably 0.85/1 to 1.2/1. Of course, when water is employed as a chain-extender, these ratios will not be applicable since the water, functioning both as a chain-extender and a dispersing medium, will be present in a gross excess relative to the residual NCO groups.

It is evident from all the foregoing that the term "polyurethane" as used in this specification is intended to apply not only to polymers (or prepolymers) having only urethane linkages formed from isocyanate and hydroxyl groups, but also to polymers, prepolymers or polymer segments having, in addition to urethane linkages, linkages formed from isocyanate groups and groups such as —NH$_2$, —NH—, (urea linkages) or —SH groups (thio-urethanes).

The weight average molecular weight (Mw) of the polyurethane (after chain-extension) is preferably at least 30,000 g/mol, more preferably at least 40,000 g/mol, most preferably at least 50,000 g/mol and especially at least 80,000 g/mol. The Mw normally does not usually exceed 1,200,000 g/mol.

The acid value of the polyurethane is preferably in the range of from 6 to 35, more preferably 10 to 30 mg KOH/g.

Since only a low level of polyurethane is used, it is important to cover as much surface of the acrylic with polyurethane as possible. Preferably the particle size of the urethane may be smaller than the particle size of vinyl polymer (d).

A vinyl polymer of the invention composition having Tg of less than 20° C. is termed herein a "soft" polymer for convenience, while a vinyl polymer of the invention composition having Tg of at least 20° C. is termed herein a "hard" polymer for convenience.

The vinyl polymers of differing Tg (as defined) may be present in the composition as a single blend of preformed (separately prepared) polymers, or as a sequentially formed composition of the polymers, whereby one vinyl polymer has been prepared (by polymerisation of its constituent monomers) in the presence of another, preformed, vinyl polymer again so that there is a Tg difference (as defined) between the vinyl polymers.

The amount of vinyl polymer (c) is preferably 50 to 85 wt. % and more preferably 60 to 80 wt. % relative to the amount of (c) and (d) together.

The Tg of vinyl polymer (c) is preferably <10° C., more preferably <0° and most preferably ≤−10° C.

The amount of vinyl polymer (d) is preferably 15 to 50 wt. % and more preferably 20 to 40 wt. % relative to the amount of (c) and (d) together.

The Tg of vinyl polymer (d) is preferably ≥40° C., more preferably ≥60° C., most preferably ≥80° C.

The Tg of hard vinyl polymer (d) is preferably at least 30° C., more preferably at least 50° C., and most preferably at least 65° higher than the Tg of soft vinyl polymer (c).

If the vinyl polymers are in the form of a blend or a sequential polymer then there is less need for a difference in molecular weight or acid value and a Tg difference as described above is sufficient.

The weight ratio of soft vinyl polymer (c) to hard vinyl polymer (d) is preferably within the range of from 35/65 to 90/10, more preferably from 40/60 to 85/15, and most preferably from 45/55 to 80/20.

If the vinyl polymers are in the form of a blend the acid value for the soft and hard vinyl polymer together in a blend are preferably in the range of from 0 to 80, more preferably 30 to 65 and most preferably 6 to 50 mg KOH/g solid polymer.

Preferably at least one of vinyl polymers (c) and (d) contains acid functional groups so that the acid value of the resulting vinyl polymer is in the range of from 15 to 100 mg KOH/g and more preferably 30 to 70 mg KOH/g.

Additionally at least one of vinyl polymers (c) and (d) may contain acid functional groups so that the acid value of the resulting vinyl polymer is in the range of from 101 to 240 mg KOH/g.

If the vinyl polymers are in the form of a blend then in one embodiment one vinyl polymer has a weight average molecular weight of less than 200,000 g/mol and more preferably less than 60,000 g/mol, while the other vinyl polymer preferably has a weight average molecular weight of more than 100,000 g/mol and more preferably more than 250,000 g/mol). Optionally both vinyl polymers may have a weight average molecular weight more than 200,000 g/mol and a weight average molecular weight below 6,000,000 g/mol, more preferably below 2,000,000 g/mol.

If the vinyl polymers are in the form of oligomer polymers where the polymer is a soft vinyl polymer and the oligomer is a low weight average molecular weight hard vinyl polymer, then the following preferences may apply:

the soft vinyl polymer preferably comprises a vinyl polymer with Tg<10° C., more preferably <0° C. and >−35° C., the soft vinyl polymer preferably has a weight average molecular weight >50,000 g/mol, more preferably >100,000 g/mol, the soft vinyl polymer preferably has an acid value in the range of from 0 to 40, more preferably 0 to 10 mgKOH/g solid polymer and most preferably 0 mgKOH/g solid polymer, the hard vinyl oligomer preferably comprises a vinyl oligomer with Tg in the range of from 30 to 125° C., more preferably 50 to 125° C., the hard vinyl oligomer preferably has a weight average molecular weight in the range of from 500 to 80,000 g/mol, more preferably 2000 to 50,000 g/mol and most preferably 5000 to 30,000 g/mol the hard vinyl oligomer preferably has an acid value in the range of from 15 to 240, preferably 15 to 120 and more preferably 31 to 94 mg KOH/g solid polymer.

Turning now generally to the production of a vinyl polymer for use in the invention composition, whether for use in a blend, or as each component of a sequential composition.

By a vinyl polymer herein is meant a homo- or copolymer derived from the addition polymerisation (using a free radical initiated process and usually in an aqueous medium), preferably by aqueous emulsion polymerisation, of a monomer composition comprising at least 40 wt. % of one or more monomers of the formula:

$CH_2=CR^2COOR^3$ where $R^2$ is H or methyl, and $R^3$ is optionally substituted alkyl of 1 to 20 carbon atoms (more preferably 1 to 8 carbon atoms) or cycloalkyl of 5 to 20 carbon atoms. Such monomers are referred to herein as vinyl monomers. More preferably, the monomer composition contains at least 50 wt. % of vinyl monomer. Examples of such vinyl monomers include methyl acrylate, methyl methacrylate, ethyl acrylate, ethyl methacrylate, n-butyl acrylate, n-butyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as hydroxyethyl acrylate, hydroxyethylmethacrylate, 2-hydroxypropyl methacrylate and 2-hydroxypropyl acrylate. Preferred vinyl monomers include methyl methacrylate, n-butyl acrylate, n-butyl methacrylate and 2-ethylhexyl acrylate.

The monomer composition to form the vinyl polymer may of course include monomers other than the vinyl monomers defined above and which are copolymerised with one or more of such vinyl monomers. Examples of such monomers include 1,3-butadiene, isoprene, styrene, a-methyl styrene, divinyl benzene, acrylonitrile, methacrylonitrile, vinyl halides such as vinyl chloride vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate, and olefinically unsaturated monocarboxylic or dicarboxylic acids, such as acrylic acid, methacrylic acid, 2-carboxyethyl acrylate, fumaric acid, maleic acid, and itaconic acid. Particularly preferred other monomers are selected from (esters of) acrylic acid and methacylic acid, styrene and acrylonitrile.

Functional monomers which impart crosslinkability (crosslinking monomers for short) include epoxy (usually glycidyl, for example glycidyl (meth)acrylate (G(M)A) or 3,4-epoxy-cyclohexylmethyl-acrylate) and hydroxyalkyl (usually C1-C12, e.g. hydroxyethyl) methacrylates and acrylates, as well as keto or aldehyde functional monomers such as acrolein, methacrolein and vinyl methyl ketone, the acetoacetoxy esters of hydroxyalkyl (usually C1-C12) (meth)acrylates and (meth)acrylamides such as acetoacetoxyethyl methacrylate and acrylate, and also keto-containing amides such as diacetone acrylamide. Ethylenically unsaturated monomers like (meth)acrylamide, N,N-alkyl (meth)acrylamides such as N,N-dimethylacrylamide and N,N-diethylacrylamide, and methoxypolyethyleneoxide (meth)acrylate may also be used. Typical crosslinking components for epoxy groups are polyamines. For keto or aldehyde functional monomers polyamines, polyhydrazides or combinations thereof are often used.

Improved wet adhesion is typically achieved by using cyclic ureido compounds. This includes ureido functional monomers, such as N-(2-methacrylamidoethyl) ethylene urea (for example Sipomer WAM II, available from Rhodia), N-(2-methacryloyloxyethyl) ethylene urea (for example Plex 6852-O, available from Degussa, or Norsocryl 104, available from Ato Fina), N-(2-methacryloxyacetamidoethyl)-N,N'-ethylene urea, allyl ureido wet adhesion monomer (Sipomer WAM, available from Rhodia), allylalkyl ethylene urea, Cylink C4 wet adhesion monomer (available from Cytec), N-methacrylamido-methyl urea, N-methacryloyl urea, N-[3-(1,3-diazacyclohexan-2-one)propyl]methacrylamide, 2-(1-imidazolyl)ethyl methacrylate and 2-(1-imidazolidin-2-on)ethyl methacrylate Other suitable crosslinking functionalities include alkoxy silane functional groups such as methacryloxypropyltrimethoxysilane where the purpose of using such functional monomer is to provide subsequent crosslinkability in the resulting polymer system.

The polymerisation of the monomer composition to form a vinyl polymer will normally require the use of a free-radical-yielding initiator to initiate the polymerisation.

Suitable free-radical-yielding initiators include inorganic peroxides such as K, Na or ammonium persulphate, hydrogen peroxide, or percarbonates; organic peroxides, such as acyl peroxides including for example benzoyl peroxide, alkyl hydroperoxides, such as t-butyl hydroperoxide and cumene hydroperoxide; dialkyl peroxides such as di-t-butyl 13 peroxide; peroxy esters such as t-butyl perbenzoate and the like; mixtures may also be used. The peroxy compounds are in some cases advantageously used in combination with suitable reducing agents (redox systems) such as Na or K pyrosulphite or bisulphite, and i-ascorbic acid. Azo compounds such as azoisobutyronitriie may also be used. Metal compounds such as Fe.EDTA (EDTA is ethylene diamine tetracetic acid) may also be usefully employed as part of a redox initiator system. An initiator system partitioning between the aqueous and organic phases, for example a combination of t-butyl hydroperoxide, iso-ascorbic acid and Fe. EDTA, may be of particular use. The amount of initiator or initiator system to use is conventional, for example within the range 0.05 to 6 wt. % based on the total monomer used.

An aqueous polymerisation to form vinyl polymers normally needs to be performed in the presence of a stabilising and or dispersing material, and when making an aqueous latex of a vinyl polymer, a conventional emulsifying agent would need to be employed (e.g. anionic and or nonionic emulsifiers such as Na salts of dialkylsulphosuccinates, Na salts of sulphated oils, Na salts of alkyl sulphonic acids, Na, K and ammonium alkyl sulphates such as sodium lauryl sulphate, C22-24 fatty alcohols, ethoxylated fatty acids and for fatty amides, and Na salts of fatty acids such as Na stearate and Na oleate; the amount used is usually 0.1 to 5% by weight on the weight based on the total vinyl monomer used.

A buffer material, such as sodium bicarbonate, is often employed in polymerisations to form vinyl polymers.

In the invention composition, it is preferred that the weight average particle diameter (Dw) (i.e. the particle size—since the particles are essentially spherical) of the polyurethane particles is within the range of from 20 to 200 nm, more preferably 30 to 150 nm, and Dw of the vinyl polymer in case of a sequential or oligomer-polymer particles is within the range of from 30 to 500 nm, more preferably from 45 to 250 nm and most preferably from 50 to 150 nm. In case of a blend, the same ranges apply for both particles with a preference of the high Tg particles size being in the range 70 to 120 nm when the Tg of the high Tg particles is above 60° C. Preferably the Dw of the vinyl polymers is larger than the Dw of the polyurethane. (It is to be understood that Dw is applicable to, i.e. is the average of, bimodal or polymodal particle size distributions, as well as monomodal distributions). Preferably, the Dw of the vinyl polymers is at least 10 nm, more preferably 30 nm larger than that of the polyurethane particles.

The disposition of the defined vinyl and polyurethane polymers in the invention composition can be envisaged in several embodiments, as exemplified but not limited by the following:
1) a blend of soft and hard vinyl polymers (separately prepared) in admixture with a polyurethane;
2) a sequentially polymerised combination of at least one hard vinyl polymer and at least one soft vinyl polymer where the soft vinyl polymer is preferably polymerised in the presence of the hard vinyl polymer, or vice versa, in admixture with a polyurethane;
3) a oligomer-polymer combination where the soft vinyl polymer is polymerized in presence of the hard vinyl oligomer, preferably after neutralization of the oligomer, in admixture with a polyurethane.

Pigments which may be used in the present invention include, for example, titanium dioxide, iron oxide, chromium-based compounds and metal phthalocyanine compounds. They are finely divided inorganic or organic powders (usually of particle size in the region of 0.1 to 10 μm, and obtained e.g. by grinding or milling) for achieving properties such as colour, opacity, and hiding power. They are usually incorporated into a coating composition in the form of a dry powder or a uniform dispersion of the pigment in a suitable carrier medium. Titanium dioxide (a white pigment) is the most preferred pigment in the present invention.

It is also possible to add transparent inorganic additives and examples include but are not limited to such as zirconium oxide ($ZrO_2$), titanium oxide ($TiO_2$), silicon oxide ($SiO_2$), aluminum oxide ($Al_2O_3$), iron oxide ($Fe_2O_3$, FeO, $Fe_3O_4$), copper oxide (CuO, $Cu_2O$), zinc oxide (ZnO), yttrium oxide ($Y_2O_3$), niobium oxide ($Nb_2O_5$), molybdenum oxide ($MoO_3$), indium oxide ($In_2O_3$, $In_2O$), tin oxide ($SnO_2$), tantalum oxide ($Ta_2O_5$), tungsten oxide ($WO_3$, $W_2O_5$), lead oxide (PbO, $PbO_2$), bismuth oxide ($Bi_2O_3$), cerium oxide ($CeO_2$, $Ce_2O_3$), antimony oxide ($Sb_2O_3$, $Sb_2O_5$), germanium oxide ($GeO_2$, GeO), lanthanum oxide ($La_2O_3$) and ruthenium oxide ($RuO_2$).

In a preferred embodiment the aqueous coating composition of the invention is used as a clear lacquer and comprises:
I) 2 to 15 wt. %, more preferably 2 to 12 wt. %, most preferably 3 to 10 wt. % and especially 3 to 9 wt. % of the polyurethane (i);
II) 25 to 50 wt. %, more preferably 30 to 45 wt. % and most preferably 31 to 42 wt. % of the vinyl polymer (ii);
III) 35 to 74 wt. %, more preferably 40 to 70 wt. % and most preferably 45 to 65 wt. % of water;
IV) 0 to 4 wt. % of transparent inorganic additives;
where I), II), III) and IV) all add up to 100%.

In a further embodiment the aqueous coating composition of the invention is used as a pigmented lacquer and comprises:
I) 1 to 10 wt. %, more preferably 1.5 to 8 wt. % most preferably 2 to 6 wt. % of the polyurethane (i);
II) 10 to 40 wt. %, more preferably 15 to 35 wt. % and most preferably 20 to 30 wt. % of the vinyl polymer (ii);
III) 30 to 79 wt. %, more preferably 35 to 60 wt. %, most preferably 40 to 50 wt. % of water;
IV) 10 to 30 wt. %, more preferably 16 to 29 wt. % and most preferably 22 to 28 wt. % of pigment;
where I), II), III) and IV) all add up to 100%.

Elongation at break as used herein is a measure of the elongation at break of an unsupported film (i.e. not on a substrate) and is measured using an Instron tensile device and is defined as the maximum elongation until break under a constant strain rate.

Preferably when the aqueous (non-pigmented) composition is in the form of a film it has an elongation at break of at least 140% at 10 wt. % of polyurethane, more preferably at least 160% at 10 wt. % of polyurethane and especially at least 180% at 10 wt. % of polyurethane at room temperature.

Preferably when the aqueous (non-pigmented) composition is in the form of a film it has an elongation at break of at least 180% at 15 wt. % of polyurethane, more preferably at least 200% and most preferably at least 220% at room temperature.

Preferably when the aqueous (non-pigmented) composition is in the form of a film it has an elongation at break of at least 200% at 20 wt. % of polyurethane, more preferably at least 220% and most preferably at least 250% at room temperature.

A pigmented coating with a pigment volume concentration range of 10 to 30 vol. %, more preferably 15 to 25 vol %, most preferably 18 to 22 vol %, has an elongation at break of at least 60%, more preferably 80% and most preferably 100% at 10 wt. % of polyurethane at room temperature.

A pigmented coating with a pigment volume concentration range of 10 to 30 vol. %, more preferably 15 to 25 vol %, most preferably 18 to 22 vol %, has an elongation at break of at least 100%, more preferably at least 120%, most preferably 140% at 15 wt. % of polyurethane.

A pigmented coating with a pigment volume concentration range of 10 to 30 vol. %, more preferably 15 to 25 vol %, most preferably 18 to 22 vol %, has an elongation at break of at least 130%, more preferably at least 150%, most preferably 170% at 20 wt. % of polyurethane.

The invention composition, as discussed above, has an exceptionally advantageous combination of low minimum film forming temperature (MFFT) and high hardness and good blocking properties. It is preferred that the MFFT of the invention composition is <25° C., more preferably <20° C. and most preferably <15° C. Being aqueous based the lower limit of MFFT for the invention composition will be the freezing point of the aqueous carrier phase. This will usually be about 0° C. (perhaps slightly lower if there are any dissolved constituents, although not usually below −20° C.).

The Tg of a polymer herein stands for the glass transition temperature and is well known to be the temperature at which a polymer changes from a glassy, brittle state to a rubbery state. Tg values of polymers may be determined experimentally using techniques such as Differential Scanning Calorimetry (DSC) or calculated theoretically using the well-known Fox equation where the Tg (in Kelvin) of a copolymer having "n" copolymerised comonomers is given by the weight fractions "W" and the Tg values of the respective homopolymers (in Kelvin) of each comonomer type according to the equation $$1/Tg = W_1/Tg_1 + W_2/Tg_2 + \ldots W_n/Tg_n.$$

The calculated Tg in Kelvin may be readily converted to ° C.

The solids content of an aqueous composition of the invention is usually within the range of from about 20 to 65 wt % on a total weight basis, more usually 30 to 55 wt %. Solids content can, if desired, be adjusted by adding water or removing water (e.g. by distillation or ultrafiltration).

Molecular weights are determined herein using gel permeation chromatography using a polymer, e.g. polystyrene, of known molecular weight as a standard. Gel permeation chromatography (GPC) analyses for the determination of polymer molecular weights were performed on an Alliance Waters 2690 GPC with two consecutive PL-gel columns (type Mixed-C, l/d=300/7.5 mm) using tetrahydrofuran (THF) as the eluent at 1 cm.sup.3/min and using an Alliance Waters 2410 refractive index detector. Samples corresponding to about 16 mg of solid material were dissolved in 8 cm.sup.3 of THF, and the mixtures were stirred until the samples had dissolved. The samples were left undisturbed for at least 24 hours for complete "uncoiling" and subsequently were filtered (Gelman Acrodisc 13 or 25 mm o CR PTFE; 0.45 μm) and placed on the auto-sampling unit of the GPC. A set of polystyrene standards (analysed according to DIN 55672) was used to calibrate the GPC.

All species with a molecular weight less than 1000 g/mol are ignored when calculating the Mw.

The acid value be measured if the ionic groups are carboxylic acid groups and sulphonic acid groups. Acid value is measured according to ASTM D1369-90 and are based on solid polymer.

The weight average particle diameter or size herein is that as determined by light scattering using a Malvern Zeta sizer 3000 HSa.

The aqueous polymer compositions of the invention may be used in various applications and for such purposes may be further optionally combined or formulated with other additives or components (to form compositions), such as defoamers, rheology control agents, thickeners, dispersing and stabilising agents (usually surfactants), wetting agents, fillers, extenders, fungicides, bactericides, anti-freeze agents, waxes and pigments.

The aqueous polymer compositions may for example be used, appropriately formulated if necessary, for the provision of films, polishes, varnishes, lacquers, paints, inks and adhesives. However, they are particularly useful and suitable for providing the basis of protective coatings for wooden substrates (e.g. wooden floors), and plastics and paper substrates.

The compositions (or compositions) once applied may be allowed to dry naturally at ambient temperature, or the drying process may be accelerated by heat.

The present invention is now further illustrated but in no way limited by reference to the following examples. Unless otherwise specified all parts, percentages, and ratios are on a weight basis. The prefix C before an example number denotes that it is comparative.

EXAMPLES

Components and Abbreviations Used:
IPDI=Isophorone diisocyanate available from Bayer
DMPA=Dimethylolpropionic acid available from Perstorp polyols
HDI=1,6-hexamethylene diisocyanate
NCO=iscoyanate group
TEA=triethylamine
CHDM=1,4-Cyclohexanedimethanol available from Eastman Chemical bv
Desmodur W=dicyclohexyl methane diisocyanate available from Bayer
EDA=Ethylene diamine available from Delamine bv
MMA=Methyl methacrylate available from ECEM European Chemical Marketing by (Tg 377K)
MAA=Methacrylic acid (Tg 501K)
BMA=n-Butyl methacrylate available from Arkema Nederland by (Tg 293K)

n-BA=n-Butyl acrylate available from BASF UK ltd (Tg 219K)
2-EHA=2-Ethylhexyl acrylate available from Dow Benelux nv (Tg 223K)
DAAM=diacetone acrylamide (Tg 338K)
3-MPA=3-mercaptopropionic acid
IAA=Isoascorbic acid available from Brenntag Volkers Benelux bv
tBHPO=tert-butyl Hydroperoxide available from Azko Nobel Chemicals bv
Fe(III)EDTA=Iron-ethylenediaminetetracetic acid complex, 1% in water
Proxel Ultra 10=Preservative (1,2-benzi9sothiazolin-3-one in water) available from Lonza
Parmetol K-40=Preservative (Water based combination of chloromethyl-/methylisothiazolone) available from Schuelke & Mayr GmbH
SR-10PG=glycol free styrene acrylic solid resin available from Indulor Chemie with an acid value of 221 mg KOH/g, Mw of 10K Dalton and a theoretical Tg of 115° C.
PolyTHF=Poly(tetramethylene ether) glycol with various average molecular weights e.g. 2000, 1000 and 2900 g/mol available from BASF
NeoRez R980=Water based soft anionic aliphatic urethane dispersion available from DSM with an acid value of 21 mgKOH/g an HDI content of 0 wt. % and DesmodurW content above 35 wt %.
BYK 346=Silicone surfactant for aqueous coatings available from Altana
Coatex BR100P=Polyurethane thickener available from Coatex (Arkema)
NeoCryl A1131=An acrylic copolymer dispersion available from DSM with one phase with a Tg of 105° C., an acid value of 17.2 mg KOH/g and a second phase with a Tg of 64° C. and an acid value of 0 mgKOH/g.
NeoCryl XK-99=An acrylic emulsion available from DSM with one phase with a Tg of −16.4° C. and acid value of 28.8 mgKOH/g and second phase with a Tg of 80° C. and acid value of 28.8 mgKOH/g and a minimum film forming temperature <0° C.
Borchigel L75=urethane thickener available from Bayer
Dehydran 1293=Defoamer additive available from Cognis; 10% in butyl glycol
Disperbyk 2015=VOC- and solvent-free wetting and dispersing additive available From Altana
Tego Foamex 810=Defoamer concentrate polyether siloxane copolymer, contains fumed silica, available from Evonik
Tioxide TR-92=titanium dioxide pigment available from Huntsman Vinyl Polymers Vinyl polymers VP1, VP2, VP4, VP7 as described herein have a molecular weight higher than 100,000 g/mol. Vinyl polymer VP5 and VP6 as described herein have a molecular weight less than 60,000 g/mol. VP3 is a combination of a vinyl polymer having a molecular weight higher than 100,000 g/mol and a vinyl polymer having a molecular weight less than 60,000 g/mol.

Vinyl Polymer (d) [VP1]

A 2000 cm$^3$ flask equipped with a thermometer and overhead stirrer was charged with water (627 g), sodium lauryl sulphate (8.6 g) and ammonium persulphate (0.44 g) and heated to 85° C. At 85° C. a mixture of water (415 g), sodium lauryl sulphate (36.8 g), ammonium persulphate (3.96 g), MAA (26.4 g), MMA (826.7 g), and 2-EHA (26.3 g) was added over a period of 120 minutes. At the end of the feed, the reaction was stirred at 85° C. for 30 minutes. Then tBPHO (2.93 g of a 30 wt. % solution in water) was added followed by isoascorbic acid (17.6 g of a 5 wt. % solution in water). After 15 minutes at 85° C., the reaction mixture was cooled to room temperature and the pH was adjusted to 7.5 to 8.0 with ammonia (25% in water). Proxel Ultra 10 (8.79 g) was added and the batch was filtered through a filter cloth to remove any coagulum formed during the reaction. Solids: 45%; pH 8.0; viscosity 64 mPas; particle size: 74 nm; acid value 48.4 mgKOH/g; Tg 100° C.

Vinyl Polymer (c): [VP2]

Same procedure as described above for VP1 with a monomer feed: MAA (26.38 g), MMA (233.41 g), and 2-EHA (619.55 g). Solids: 45%; pH 8.0; viscosity 51 mPas; particle size: 98 nm; acid value 48.4 mgKOH/g; Tg −18° C.

Vinyl Polymer [VP3] (Sequential Oligomer Polymer Composition)

A 2000 cm$^3$ flask equipped with a thermometer and overhead stirrer was charged with water (533.2 g) and sodium lauryl sulphate (1.6 g) and heated to 85° C. under a nitrogen atmosphere. At 70° C. 10% of a mixture of water (97.0 g), sodium lauryl sulphate (4.6 g), MAA (28.8 g), DAAM (14.4 g), BMA (28.8 g), MMA (168.4 g) and 3-MPA (5.8 g) was added. At 75° C. a mixture of water (11.0 g) and ammonium persulphate (0.2 g) was added. At 85° C. the remaining 90% mixture was added over a period of 60 minutes. Together with this mixture a mixture of water (33.2 g) and ammonium persulphate (0.6 g) was added over a period of 70 minutes. At the end of the feed, the reaction was stirred at 85° C. for 20 minutes. Then the batch was cooled to 80° C. and a mixture of water (21.0 g) and ammonia (23.0 g, 25% in water) was added in 15 minutes. The batch was stirred for 20 minutes and cooled to 60° C. At 60° C. 33% of the mixture of water (7.2 g) and tBHPO (1.0 g of a 70 wt. % solution in water) was added. Followed by the addition of 33% of the mixture of DAAM (12.4 g), n-BA (406.6 g) and MMA (197.0 g). After mixing for 15 minutes 40% of a solution of water (23.2 g) and isoascorbic acid (1.4 g) which is adjust at pH =8.5 with ammonia (25% in water) is added. After a peak temperature of 86° C. is reached, the batch was stirred for 10 minutes. Water (100.6 g) was added and the batch was cooled to 60° C. 33% of the monomer mixture was added. Fe(III)EDTA 1% in water (0.02 g) is added and the batch was stirred for 15 minutes. 33% of the tBHPO/water mixture was added followed by 33.3% of the remaining isoascorbic acid/water mixture. After a peak temperature of 86° C. is reached, the batch was stirred for 10 minutes. Water (138.2 g) was added and the batch was cooled to 60° C. 33% of the monomer mixture was added and the batch was stirred for 15 minutes. 33% of the tBHPO/water mixture was added followed by the remaining isoascorbic acid/water mixture. After the peak temperature of 86° C. was reached the batch was cooled to room temperature. Water was added (115.0 g) followed by Parmetol K-40 (2.2 g) and Proxel Ultra 10 (10.0 g). The batch was filtered through a filter cloth to remove any coagulum formed during the reaction. Solids: 43.5%; pH: 7.5; viscosity: 185 mPas; particle size: 89 nm. Vinyl polymer (d): Tg 99° C.; acid value 107 mgKOH/g. Vinyl polymer (c): Tg 18° C.; acid value 0 mgKOH/g.

Vinyl Polymer (c) [VP4]

A 2000 cm$^3$ flask equipped with a thermometer and overhead stirrer was charged with water (627.6 g), sodium lauryl sulphate (8.6 g) and ammonium persulphate (0.4 g) and heated to 85° C. under a nitrogen atmosphere. At 85° C. a mixture of water (340.0 g), sodium lauryl sulphate (32.8 g), MAA (26.4 g), 2-EHA (620.2 g) and MMA (233.6 g) was added over a period of 120 minutes. Together with this mixture a mixture of water (75.4 g), sodium lauryl sulphate (4.0 g) and ammonium persulphate (4.0 g) was added (also over 120 minutes). At the end of the feed, the reaction was stirred at 85° C. for 15 minutes. Then tBHPO (2.8 g of a 30 wt. % solution in water) was added followed by isoascorbic acid (17.6 g of a 4.5 wt. % solution in water). After 15 minutes at 85° C., the reaction mixture was cooled to room temperature and the pH was adjusted to 8,0 with ammonia (12.5% in water). Proxel Ultra 10 (6.6 g) was added and the batch was filtered through a filter cloth to remove any coagulum formed during the reaction. Solids: 45%; pH 8.0; viscosity 67 mPas; particle size 92 nm; Tg −18° C.; acid value 48.4 mgKOH/g.

Vinyl Oligomer (d) [VP5]

A 2000 cm$^3$ flask equipped with a thermometer and overhead stirrer was charged with water (1071.4 g) and sodium lauryl sulphate (3.0 g) and heated to 85° C. under a nitrogen atmosphere. At 70° C. 10% of a mixture of water (194.8 g), sodium lauryl sulphate (9.0 g), MAA (58.0 g), DAAM (29.0 g), BMA (58.0 g), MMA (338.2 g) and 3-MPA (11.6 g) was added. At 75° C. a mixture of water (22.0 g) and ammonium persulphate (0.4 g) was added. At 85° C. the remaining 90% mixture was added over a period of 60 minutes. Together with this mixture a mixture of water (66.6 g) and ammonium persulphate (1.0 g) was added over a period of 70 minutes. At the end of the feed, the reaction was stirred at 85° C. for 20 minutes. Then the batch was cooled to 80° C. and a mixture of water (42.0 g) and ammonia (46.2 g, 25% in water) was added in 15 minutes. The batch was stirred for 20 minutes and cooled to room temperature. Parmetol K-40 (4.2 g) and Proxel Ultra 10 (19.98 g) are added and the batch was filtered through a filter cloth to remove any coagulum formed during the reaction. Solids: 23.8%; pH: 7.5; viscosity: 10 mPas; Mwt: 16.6 kDa; Tg 100° C.; acid value 107 mgKOH/g.

High Acid Styrene-Acrylic Co-Polymer (d) [VP6]

A 2000 cm3 flask equipped with a thermometer and overhead stirrer was charged with water (777.3 g) and SR-10PG (259.1 g) and heated to 85° C. under a nitrogen atmosphere. During heating ammonia (68.36 g, 25% in water) was added and the batch was stirred for 70 minutes. The batch was cooled down to room temperature and filtered through a filter cloth to remove any coagulum. Solids: 22.3%; pH: 8.5; viscosity: 22 mPas.

Vinyl Polymer (d) [VP7]

Same procedure as described above for VP1 with in the monomer feed: MAA (26.38 g), MMA (580.92 g), and 2-EHA (272.04 g). Solids: 45%; pH=8.1; viscosity 30 mPas; particle size: 84 nm; acid value 48.4 mgKOH/g; Tg 40° C.

Polyurethanes:

All of the polyurethanes as described herein have 0 mmoles per g of olefinically unsaturated bonds (i.e. no olefinically unsaturated bonds at all).

The weight average molecular weight (Mw) of the polyurethanes (after chain-extension) in the examples below is within the range from 30,000 g/mol to 1,200,000 g/mol.

The acid value of the polyurethanes in the examples below is in the range of from 10 to 30 mg KOH/g.

Polyurethane [PU1]:

A polyurethane prepolymer was prepared by mixing Poly-THF2000 (382 g), DMPA (26 g), HDI (78 g) and dibutyltin dilaurate catalyst in acetone (262 g). The mixture was heated to 60° C. and maintained at this temperature until the NCO-content reached <1.5% NCO/g resin. The mixture was cooled and TEA was added (12 g) before adding water as chain-extender and disperse the prepolymer. The solvent was removed by vacuum distillation until the solids content reached a plateau value. The reactor content was cooled further and the vacuum released. The solids content was 38 wt. %. Viscosity 200 mPas; pH 71, particle size: 90 nm, sediment below 0.1%; acid value 22.4 mg KOH/g.

Polyurethane [PU2]

A polyurethane prepolymer was prepared by mixing Poly-THF1000 (308 g), DMPA (18 g), CHDM (4 g), HDI (110 g) and dibutyltin dilaurate in acetone (237 g). The mixture was heated to 60° C. and maintained at this temperature until the NCO-content reached <2.33% NCO/g resin. The mixture was cooled and TEA was added (8 g) before adding water as chain-extender and disperse the prepolymer. The solvent was removed by vacuum distillation until the solids content reached a plateau value. The reactor content was cooled further and the vacuum released. The solids content was 40 wt. %. Viscosity 6030 mPas; pH 7.7, particle size: 145 nm, sediment below 0.3%; acid value 16.7 mg KOH/g; $M_w$ 121,136 g/mol.

Polyurethane [PU3]

A polyurethane prepolymer was prepared by mixing Poly-THF2900 (372 g), DMPA (18 g), HDI (53 g) and dibutyltin dilaurate in acetone (239 g). The mixture was heated to 60° C. and maintained at this temperature until the NCO-content reached <0.65% NCO/g resin. The mixture was cooled and TEA was added (9 g) before adding water as chain-extender and disperse the prepolymer. The solvent was removed by vacuum distillation until the solids content reached a plateau value. The reactor content was cooled further and the vacuum released. The solids content was 40 wt. %. Viscosity 450 mPas; pH 7.1, particle size: 104 nm, sediment below 0.3%, acid value 16.7 mg KOH/g; $M_w$ 59,734 g/mol.

Polyurethane [PU4]

A polyurethane prepolymer was prepared by mixing Poly-THF1000 (282 g), DMPA (18 g), CHDM (4 g), HDI (53g), DesmodurW (83 g) and dibutyltin dilaurate in acetone (237 g). The mixture was heated to 60° C. and maintained at this temperature until the NCO-content reached <2.24% NCO/g resin. The mixture was cooled and TEA was added (8 g) before adding water as chain-extender and disperse the prepolymer. The solvent was removed by vacuum distillation until the solids content reached a plateau value. The reactor content was cooled further and the vacuum released. The solids content was 40 wt. %. Viscosity 25 mPas; pH 7,2, particle size: 127 nm, sediment below 0.3%; acid value 16.7 mg KOH/g; $M_w$ 50,998 g/mol.

Polyurethane [PU-5]

A polyurethane prepolymer was prepared by mixing Poly-THF2000 (528 g), DMPA (40 g), HDI (69 g), IPDI (162 g) and dibutyltin dilaurate. The mixture was heated to 90° C. and maintained at this temperature until the NCO-content reached <5.9% NCO/g resin. The mixture was cooled to 60° C. and TEA was added (24 g). The prepolymer was dispersed into water and extended with EDA (29 g). The solids content was 34 wt. %. Viscosity 30 mPas; pH 7.7, particle size: 80 nm; sediment below 0.1%; acid value 20.9 mg KOH/g.

EXAMPLES

All polymer blends were prepared by mixing the polymers described above. First the blends between the acrylic polymers were made by starting with the acrylic polymer with the largest amount and then blending the second acrylic polymer to the first acrylic polymer under stirring and subsequently the polyurethane dispersions were added under stirring. All of these blends comprised less than 0.5 wt. % solvent based on the total composition.

The blends are shown below in Table 1

TABLE 1

| Example | Polymers | Polymers in grams of dispersion in the blend | Ratio % s/s |
|---|---|---|---|
| 1# | PU1/VP1/VP2 | 10/45/45 | 8.6/45.7/45.7 |
| 2 | PU-2/VP3 | 3.88/31.12 | 10/90 |
| 3 | PU-3/VP4/VP5 | 7.71/55.7/44.3 | 8/64.4/27.6 |
| 4 | PU-3/VP4/VP5 | 3.14/17.7/14.1 | 10/63/27 |
| 5 | PU-3/VP4/VP5 | 4.73/16.85/13.4 | 15/59.5/25.5 |
| 6 | PU-3/VP4/VP5 | 6.35/15.9/12.7 | 20/56/24 |
| 7 | PU-4/VP4/VP6 | 4.27/27.6/13.1 | 10/72/18 |
| 8* | PU-4/VP4/VP6 | 31.42/67.7/32.3 | 25/60/15 |
| 9 | PU-5/VP4/VP6 | 4.73/24.6/15.6 | 10/67.5/22.5 |
| 10 | PU-5/VP4/VP6 | 14.4/61.2/38.8 | 12/66/22 |

Comparative Examples

Comparative Example C1

Consisted of a blend of a 90 wt. % of the vinyl polymer [VP7] with a Tg of 40° C. with 10 wt. % of polyurethane [PU1].

Comparative Example C2

GB 2362387, Example 5: Synthesis and subsequent blending of the soft/hard sequential acrylic polymer composition AP5 as described on pg 18 line 36 to pg 19 line 2 and Table 2 with 10% and 30% R-980.

(10% R-980/90% AP5) 16.67 gs of NeoRez R-980 was added under stirring to 150 g of AP5. To 45 g of the binder, 1.1 g butylglycol 50 wt. % in water with a droplet ammonia, 0.3 g BYK 346, and 0.35 g Coatex BR100P 50 wt. % were added under stirring.

(30% R-980/70% AP5) 42.86 g of R-980 was added under stirring to 100 gs of AP5. To 45 g of the binder, 1.1 g butylglycol 50 wt. % in water with a droplet ammonia, 0.3 g BYK 346, and 0.35 g Coatex BR100P 50 wt. % were added under stirring.

Comparative Example C3

WO99/16805, example 7: Synthesis of the 25/75 urethane/acrylic polymer as described on page 26, line 30 to page 28 line 19. The isocyanate content was 76%. To 45 g of this urethane/acrylic polymer dispersion 1.1 g butylglycol 50 wt. % in water with a droplet ammonia, 0.3 g BYK 346, and 0.35 g Coatex BR100P 50 wt. % were added under stirring.

Comparative Example C4

WO2005/023947, example 3 was prepared at lower urethane-acrylic ratios because the disclosed urethane-acrylic ratio of example 3 is 45 wt. % of polyurethane A1 and 55 wt % acrylic, this corresponds to 39.4% solid on solid of the polyurethane A1 (35% Polymer B1: NeoCryl A1131 and 20% of vinyl polymer C2: NeoCryl XK-99). A urethane-acrylic ratio (10% and 30% on solids maintaining the same ratio between polymer B1 and vinyl polymer C2) was prepared.

Comparative Example C5

WO2012/084668, example 1 with a 30/70 urethane-acrylic ratio was reproduced as described on page 29 lines 9 to 30 (polyurethane PU-1 with an polyisocyanate content of 42 wt. %) and urethane-acrylic was described on page 31 line 37 to page32 line 38 (example 1.) PU-1 had a polyisocyanate content of 42 wt. %. The acrylic had an acid value of 0 mgKOH/g.

Formulations:

Subsequently the blends were formulated into coating compositions. The clear formulations contained less than 1.5 wt % of solvent based on the total formulation. The pigmented formulations contained less than 2 wt % of solvent based on the total formulation.

Clear Formulation 1:

To 30 g of the binder mixture as described in examples 2 to 7, 9 & 10, 12.09 g of water, 0.38 g of butyldiglycol (BDG), 0.32 g Dehydran 1293, and 1.53 g 25 wt. % Borchigel L75 were added under stirring.

Clear Formulation 2:

To 45 g of the binder mixture as described in example 8, 1.1 g butylglycol (BG) 50 wt. % in water with a droplet ammonia, 0.3 g BYK 346, and 0.35 g Coatex BR100P 50 wt. % were added under stirring.

Clear Formulation 3:

To 75 g of binders as described in example 1 and comparative Example 1, 32.14 g of water, 0.94 g of butyldiglycol (BDG), 0.81 g Dehydran 1293, and 1.91 g 50 wt. % Borchigel L75 were added under stirring.

Pigmented Formulation:

Pigment paste preparation is shown in Table 2 below.

To 35 g of the binder mixture as described in examples 4 and 6, 0.88 g butylglycol (BG) 50% wt. % in water with a droplet ammonia, 1.7 g 25 wt. % Borchigel L75 and 16.5 gs of pigment paste was added under stirring.

TABLE 2

| Pigment paste | Parts by weight | 100 |
|---|---|---|
| Demi water | 6 | 19.8 |
| Disperbyk 2015 | 1 | 3.3 |
| Tego Foamex 810 | 0.2 | 0.66 |
| Coatex BR100P/demi 1:1 | 0.1 | 0.33 |
| Tioxide TR-92 | 22.8 | 75.91 |
| Total | 30.1 | 100 |

The PVC of all pigmented examples is 21% (v/v)

Testing Methods of the Blends

Determination of Elongation at Break

Free films of the formulated films were made by applying 400 micron wet films onto glass plates containing release paper. These films were allowed to dry during 4 hours under ambient conditions followed by ageing for 16 hours at 52° C. The film was subsequently removed from the glass plate and at least 4 dumb bell shaped samples were cut from the free films using a DIN 52-910-53 cutter. The thickness of the film was measured. A stress-strain experiment was performed using an Instron™ 5565 instrument at a draw-bench speed of 30 mm/min.

For Example 1 and comparative example 1 ageing was carried out for 16 hours at 50° C. and the draw-bench speed was 100 mm/min.

Determination of Blocking Resistance

Films were made by applying 100 micron wet films on Leneta chart 2A. These films were allowed to dry during 1 hour under ambient conditions followed by ageing for 16 hours at 52° C. Blocking resistance was tested by putting the films face to face and placing a 1 kG/cm2 weight for 4 hours under ambient conditions. After this test period the films are separated by hand and a rating (0-5) of the block resistance was given. [0]=poor separation and [5]=excellent separation.

Test results of the Examples are shown below in Table 3:

TABLE 3

| Example | Polymers | Ratio % s/s | Elongation at break- clear [blocking resistance] | Elongation at break- pigmented [blocking resistance] |
|---------|----------|-------------|--------------------------------------------------|------------------------------------------------------|
| 1# | PU1/VP1/VP2 | 10/45/45 | 450% | |
| 2 | PU-2/VP3 | 10/90 | 305% [5] | |
| 3 | PU-3/VP4/VP5 | 8/64.4/27.6 | 368% [2] | |
| 4 | PU-3/VP4/VP5 | 10/63/27 | 438% [4] | 83% [4-5] |
| 5 | PU-3/VP4/VP5 | 15/59.5/25.5 | 456% [4] | |
| 6 | PU-3/VP4/VP5 | 20/56/24 | 654% | 132% [5] |
| 7 | PU-4/VP4/VP6 | 10/72/18 | 486% | |
| 8* | PU-4/VP4/VP6 | 25/60/15 | 688% | |
| 9 | PU-5/VP4/VP6 | 10/67.5/22.5 | 195% [2] | |
| 10 | PU-5/VP4/VP6 | 12/66/22 | 176% [4] | |

Test results of the comparative examples are shown below in Table 4

TABLE 4

| Comparative Example | Elongation at break % | Remark |
|---------------------|-----------------------|--------|
| Comparative example C1: 90 wt. % [VP3] with 10 wt. % [PU1]. | 130% | |
| Comparative Example C2 Blend ratio R-980/AP5 10/90 (solid/solid) | <10% | Film too brittle to remove from the release paper |
| Comparative Example C2 Blend ratio R-980/AP5 30/70 (solid/solid) | <10% | Film too brittle to remove from the release paper |
| Comparative example C3 WO99/16805 ex 7 25/75 urethane/acrylic | <10% | Film too brittle to remove from the release paper |
| Comparative example C4 Blend ratio polyurethane A1/polymer B1/vinyl polymer C2 (solid/solid) 10/57.3/32.7 | <10% | Film too brittle to remove from the release paper |
| Comparative example C4 Blend ratio polyurethane A1/polymer B1/vinyl polymer C2 (solid/solid) 30/44.5/25.5 | <10% | Film too brittle to remove from the release paper |
| Comparative example C5 WO2012/084668 | 111% (unformulated) 10% pigmented | |

The examples show that the elongation at break is substantially improved with regard to the comparative examples.

Comparative example C1 shows elongation at break by blending 10 wt. % of a polyurethane with an vinyl composition consisting of single phase with Tg of 40° C., which is the average composition of the two vinyl polymers from Example 1.

Comparative example C2 shows that simply lowering the wt. % of polyurethane of the disclosed example is not sufficient to get good elongation at break.

Comparative example C3 and C5 show that a high wt. % of polyisocyanate is detrimental to the elongation at break.

Comparative example C4 shows that simply lowering the wt. % of polyurethane of the disclosed example is not sufficient to get good elongation at break.

The invention claimed is:

1. An aqueous polymer composition comprising
  (i) 5 to 30 wt. % of polyurethane obtained by the reaction of:
    (a)
      (1) 9 to 31 wt. % of at least one polyisocyanate;
      (2) 0 to 8 wt. % of at least one isocyanate-reactive compound with a weight average molecular weight in the range of from 50 to 500 g/mol, containing ionic or potentially ionic water-dispersing groups;
      (3) 0 to 91 wt. % of at least one isocyanate-reactive compound with a weight average molecular weight in the range of from 501 to 5000 g/mol containing ionic or potentially ionic water-dispersing groups;
      (4) 0 to 91 wt. % of at least one isocyanate-reactive compound with a weight average molecular weight in the range of from 501 to 5000 g/mol not comprised by (3);
      where (3) and (4) add up to 57 to 91 wt. %;
      (5) 0 to 10 wt. % of at least one isocyanate-reactive compound with a weight average molecular weight in the range of from 50 to 500 g/mol not comprised by (2);
      where (1), (2), (3), (4) and (5) add up to 100%; and
    (b) at least one chain-extending compound;
      where the acid value of the resulting polyurethane (i) is between 3 to 40 mg KOH/g;
  (ii) 70 to 95 wt. % of vinyl polymer comprising
    (c) 20 to 90 wt. % of vinyl polymer with Tg<20° C.;
    (d) 10 to 80 wt. % of vinyl polymer with Tg≥20° C.;
    wherein (c) and (d) add up to 100%;
    where at least one of (c) and (d) contains acid functional groups with an acid value in the range of from 15 to 240 mg KOH/g; and
    wherein (i) and (ii) add up to 100%.

2. An aqueous polymer composition according to claim 1 wherein the weight percentage of (i) and (ii) together is more than 60 wt. % of the total composition.

3. An aqueous polymer composition according to claim 1 wherein at least one of (c) and (d) contains acid functional groups so that the acid value of the resulting vinyl polymer is in the range of from 15 to 100 mg KOH/g.

4. An aqueous polymer composition according to claim 1 wherein at least one of (c) and (d) contains acid functional groups so that the acid value of the resulting vinyl polymer is in the range of from 101 to 240 mg KOH/g.

5. An aqueous polymer composition according to claim 1 wherein the Tg of vinyl polymer (d) is at least 30° C. higher than the Tg of vinyl polymer (c).

6. An aqueous polymer composition according to claim 1 wherein the weight ratio of vinyl polymer (c) to vinyl polymer (d) is within the range of from 35/65 to 90/10.

7. An aqueous polymer composition according to claim 1 wherein at least 50 wt. % of the total amount of polyisocyanate (1) used comprises aliphatic polyisocyanate.

8. An aqueous polymer composition according to claim 1 wherein at least 30 wt. % of the total amount of polyisocyanate (1) used is selected from HDI, pentamethylene diisocyanate and or mixtures thereof.

9. An aqueous polymer composition according to claim 1 wherein the acid value of the polyurethane is in the range of from 6 to 35 mg KOH/g.

10. An aqueous polymer composition according to claim 1 containing less than 10 wt. % solvent.

11. A clear lacquer comprising the aqueous polymer composition according to claim 1 wherein said lacquer comprises:
  I) 2 to 15 wt. % of the polyurethane (i);
  II) 25 to 50 wt. % of the vinyl polymer (ii);
  III) 35 to 74 wt. % of water;
  IV) 0 to 4 wt. % of transparent inorganic additives
  where I), II), III) and IV) all add up to 100%.

12. A clear lacquer as defined in claim 11 which when in the form of a film has an elongation at break of at least 140% at 10 wt. % of polyurethane at room temperature.

13. A clear lacquer as defined in claim 11 which when in the form of a film has an elongation at break of at least 160% at 10 wt. % of polyurethane at room temperature.

14. A pigmented lacquer comprising the aqueous ploymer composition according to claim 1 as wherein said lacquer comprises:
  I) 1 to 10 wt. % of the polyurethane (i);
  II) 10 to 40 wt. % of the vinyl polymer (ii);
  III) 30 to 79 wt. % of water;
  IV) 10 to 30 wt. % of pigment;
  where I), II), III) and IV) all add up to 100%.

15. A pigmented lacquer as defined in claim 14 with a pigment volume concentration range of 10 to 30 vol. % which when in the form of a film has an elongation at break of at least 60% at 10 wt. % of polyurethane at room temperature.

16. A method of coating a substrate comprising applying to the substrate the lacquer according to claim 11.

17. A substrate having a coating comprising a lacquer according to claim 11.

\* \* \* \* \*